United States Patent [19]
Beardsley et al.

[11] Patent Number: 5,694,570
[45] Date of Patent: Dec. 2, 1997

[54] METHOD AND SYSTEM OF BUFFERING DATA WRITTEN TO DIRECT ACCESS STORAGE DEVICES IN DATA PROCESSING SYSTEMS

[75] Inventors: Brent Cameron Beardsley; Susan Kay Candelaria; Joel Harvey Cord; Michael Howard Hartung; Joseph Smith Hyde; John Norbert McCauley, Jr., all of Tucson, Ariz.

[73] Assignee: International Business Machines Corporation, Armonk, N.Y.

[21] Appl. No.: 376,292

[22] Filed: Jan. 23, 1995

Related U.S. Application Data

[63] Continuation of Ser. No. 949,667, Sep. 23, 1992, abandoned.

[51] Int. Cl.$^6$ ................................................ G06F 12/00
[52] U.S. Cl. ........................................ 395/440; 395/465
[58] Field of Search .................................. 395/440, 441, 395/439, 465, 466

[56] References Cited

U.S. PATENT DOCUMENTS

| | | |
|---|---|---|
| 4,500,954 | 2/1985 | Duke et al. ........................ 395/465 |
| 4,885,680 | 12/1989 | Anthony et al. .................... 395/471 |
| 4,916,605 | 4/1990 | Beardsley et al. ................. 395/489 |
| 5,283,884 | 2/1994 | Menon et al. ..................... 395/440 |

*Primary Examiner*—Eddie P. Chan
*Assistant Examiner*—Reginald G. Bragdon
*Attorney, Agent, or Firm*—Andrew J. Dillon

[57] ABSTRACT

The invention teaches a system and method for temporarily buffering data written to a storage system by a host computer. The storage system includes direct access storage devices and a cache. The cache is used as the buffer for both caching and noncaching data records before destaging to a direct access storage device. Upon receipt of a channel program from a host computer containing data for records to be updated, the storage controller determines if the records are currently cached. If the records are not cached, a write miss has occurred. Upon a write miss the storage controller checks an attribute transmitted in the channel program to determine if the records have a regular format. Records having a known, regular format are buffered in cache until destaged by a background process.

7 Claims, 6 Drawing Sheets

METHOD AND SYSTEM OF BUFFERING DATA WRITTEN TO DIRECT ACCESS STORAGE DEVICES IN DATA PROCESSING SYSTEMS

This is a continuation of application Ser. No. 07/949,667, filed Sep. 23, 1992 (now abandoned).

BACKGROUND OF THE INVENTION

1. Technical Field

The invention relates to data storage systems for data processing systems, and more particularly relates to controller units for disk drives serving a plurality of host main frame computers.

2. Description of the Related Art

Main frame computer systems generally use auxiliary storage devices for mass storage of data. In auxiliary storage devices data is recorded by making a physical change to a medium. Examples of physical storage of data on media are: pitting of aluminum by lasers; grooving of a plastic disk by a needle; and forming magnetic domains on a magnetic surface with an electromagnet. A transducer can then be used to sense the physical qualities of the media and to produce an electrical signal which varies in correspondence to the physical qualities of the media. For a data processing system or compact disk player, the electrical signal is decoded to reproduce binary data.

Direct Access Storage Devices (DASD, pronounced "dasdee") are one type of auxiliary storage device. In a direct access storage device access time to data is substantially independent of the location of the data in the storage device. Presently, disk drive units are the most common type of DASD. A disk drive unit records data on rotatable disks. The write and read transducers are moved radially inward and outward relative to the disk and the disk is rotated to bring any location of the disk and the appropriate transducer into proximity with one another. A DASD may be contrasted to an indirect access storage device, such as tape drives, where accessibility of data is location dependent.

The fact that access time to a location on a disk is more or less random does not mean that it is instantaneous. During a period when a DASD waits for a spinning disk to move to the correct position for a transducer to access a location, a storage controller for the DASD can perform other functions. An example of a function performed during a waiting period is the downloading of data from a buffer memory to a channel to a host computer. In large, multiple computer data processing systems, such as those serving airline reservation systems, a large number of direct access storage devices serve several computers. The storage controller is logically positioned between the DASDs and the host computers. The storage controller handles connection and disconnection between a particular computer and magnetic disk unit for transfer of data.

The IBM 3990 storage controller is an example of a storage controller used to control connections between magnetic disk units and host computers. The IBM 3990 Model 3 type controller, which is available from IBM Corporation, can handle up to sixteen channels from host computers and up to sixty-four magnetic storage units. Within the storage controller are two multipath storage directors and four storage paths, two of which are associated with each multipath storage director. Each multipath storage director may be connected to up to eight incoming channels from host computers, for a total of sixteen channels for the storage controller as a whole. Each multipath storage director is connected to two storage paths, thus functioning as an 8×2 switch.

Channels are physical links between the storage controller and the host computers. Usually, a host computer has two or four channels, half being physically connected to the one multipath storage director and the other half being connected to the other multipath storage director. Each storage path is connected to all of the available magnetic disk units. Upon indication that a disk is ready, the controller can secure any one of a plurality of the channels and storage paths back to a host to establish a data path. It is a feature of the IBM 3990 storage controller that an input/output transaction between a host computer and a magnetic disk unit may be broken into two or more separate connections, which may be handled along distinct channels and storage paths. A request need not be responded to over the same channel on which it was received. This feature increases throughput through the storage controller, because during the disconnect period the storage controller handles other tasks, such as a connection for another computer with another DASD.

While each storage path is in effect a stand alone control unit based upon its own microprocessor, the storage paths share control information through a common memory space for synchronization functions relating to handling connections, disconnections and reconnections relating to a transaction. Each storage path in a storage control unit has access to three addressable memory devices used for supporting storage control unit operation. The three memory devices are: a shared control array (SCA); a cache; and non-volatile storage. This patent deals primarily with exploitation of the cache and nonvolatile storage to increase operating speed of the storage controller.

Cache is best known for its application as an adjunct to computer memory, where cache is used as a high speed storage for frequently accessed instructions and data. The length of time since last use of a record is used as an indicator of frequency of use. Cache is distinguished from system memory in that its contents are aged from the point of time of last use. In a computer memory address space, program data has to be released before data competing for space in the address space gains access. In cache, competition for space results in data falling out of the cache when they become the least recently used data. While infrequently accessed data periodically enter cache, they will tend to "age" and fall out of cache. The contents of cache are duplicated in system memory.

Storage controller cache performs an analogous function for direct access storage devices and storage controllers. Reading data from (and writing data to) the magnetic media of the direct access storage devices is fairly time consuming. Among the factors slowing the read and write operations are time required for the magnetic disk to come to the appropriate position and the limited bandwidth of the magnetic transducers used to read and write the data. By duplicating frequently accessed data in cache, read time for data is reduced and data storage system throughput is considerably enhanced. High speed components are expensive in terms of cost per byte of storage, particularly when compared with magnetic media storage and thus cache is quite small compared to the memory device for which it acts as a buffer.

In the IBM 3990 Model storage controller, storage controller cache has been used to provide a buffering function for some data being written to a DASD device. In the IBM 3990 Model storage controller, data is conventionally stored to storage controller cache by track images. For fast write operations each track image corresponds to the contents of a physical track from a direct access storage device. Where a track image is present in cache, a write command from a host computer updating a record of the track results in the record being written over the corresponding record in the track image rather than to DASD. Time is saved over waiting for the disk to come to the correct position for direct transfer of the data from the host computer. Then, as a background process, the storage controller can transfer data from cache to disk to update a record.

The storage controller issues "channel end" and "device end" signals upon successful writing of data. To obtain the benefits of increased throughput promised by writing data intended for a direct access storage device to a buffer, the storage controller must issue the signals indicating that the data has been successfully written. However, cache is volatile while magnetic media are not. Data that are in cache are lost in the case of power failure. Data written to magnetic media are simply unaccessible until power is restored. To the host computer, a successful write of data requires that the data be relatively immune to loss from common hazards.

Nonvolatile storage (NVS) was added to the storage controller as a backup to cache for its buffering function. Nonvolatile storage can be provided by special memory circuits or by memory that has a back up power source. Access to NVS is faster than access to a direct access storage device. Data are branched to cache, for speed in transfer to the DASD, and to NVS to back up the cache in case of power failure. Data written to NVS are considered as safe as if written to magnetic media, and indication may be given to the host computer that the data are successfully stored.

In the IBM 3990 Model storage controller, the use of cache as a write buffer is called a fast write operation. However, application of the fast write process has been limited to certain conditions, stemming from the organization of data for storage on magnetic media. Before the fast write feature can be invoked, an image of the track to which the data is directed must exist in cache. The storage controller rewrites the updated record in the track image stored in cache and in NVS and later updates the track on DASD. Where a track image is not present in cache, a write miss occurs and the data must be written directly to the DASD.

From a track image in cache, a storage controller knows the format and location of the updated record in the track. The format and location information are used by a storage controller to resolve a problem raised by use of the cache for buffering functions. The problem relates to the temporary inconsistency of the contents of the cache and of the DASD after a fast write but before the updated record has been written to DASD. If a read operation is directed to an updated record before the updated record has been written to the DASD, the storage controller must assure that the request is responded to with the correct data.

While the fast write process saves operating time under selected circumstances, it is limited in utility by the requirement that an image of a prior version of the record be in cache. Some data is excluded from storage controller cache for operating reasons. Updates of such data, and storing of new records, do not benefit from the fast write process. It would be advantageous if the fast write process could be extended to data not meeting the criteria required for the fast write process.

SUMMARY OF THE INVENTION

It is an object of the invention to provide an improved method and system for mass storage of data on a data processing system.

It is another object of the invention to provide an improved method and system for buffering data being written to a direct access storage device serving a data processing system.

It is still another object of the invention to provide a method and system for mass storage of data reducing processing demands on host computers and a storage controller.

It is still another object of the invention to provide a fast write process for data to a buffer memory prior to transfer to direct access storage which dispenses with the requirement for prior presence of a track image in the buffer memory.

The invention provides a system and method for temporarily buffering data written to a storage system by a host computer. The storage system includes direct access storage devices, a cache and nonvolatile storage. The cache is used as the buffer for both caching and noncaching data records before destaging of the records to a direct access storage device. Upon receipt of a message from a host computer containing data for records to be updated, the storage controller determines if the records are currently cached. If the records are not cached, a write miss has occurred. Upon a write miss the storage controller checks an attribute of the message to determine if the records have a regular format. The method continues only for records having a known, regular format.

The storage controller writes records having a regular format to the cache and to the nonvolatile storage. If, however, the record is a noncaching record, no indication of the presence of the record is made in the record aging control structures of the cache (i.e. the most recently used (MRU) /least recently used (LRU) linked lists). Destaging of the data records from cache to a direct access storage device occurs as a background, asynchronous process. The storage locations of noncaching records are then deallocated. This includes elimination of the directory entries created for the noncaching records when they were buffered.

The invention solves problems stemming from handling intervening read operations. As a result of the step of destaging of records from cache to the direct access storage devices being asynchronous, a period of unpredictable duration can exist where the data of a record in cache and in a direct access storage device are inconsistent. Where a read operation is directed to records for which potentially inconsistent versions exist, a screening process is invoked.

Responsive to initiation of the read operation, the storage controller checks for the presence in the cache of the records being read. If none of the records are in the cache, the read operation is serviced from the direct access storage devices. If all of the records are in the cache, the read operation is serviced from the cache. If some, but not all of the records are in cache, the records which were found in cache may be destaged to the direct access storage devices, and the read operation is serviced from the direct access storage devices.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
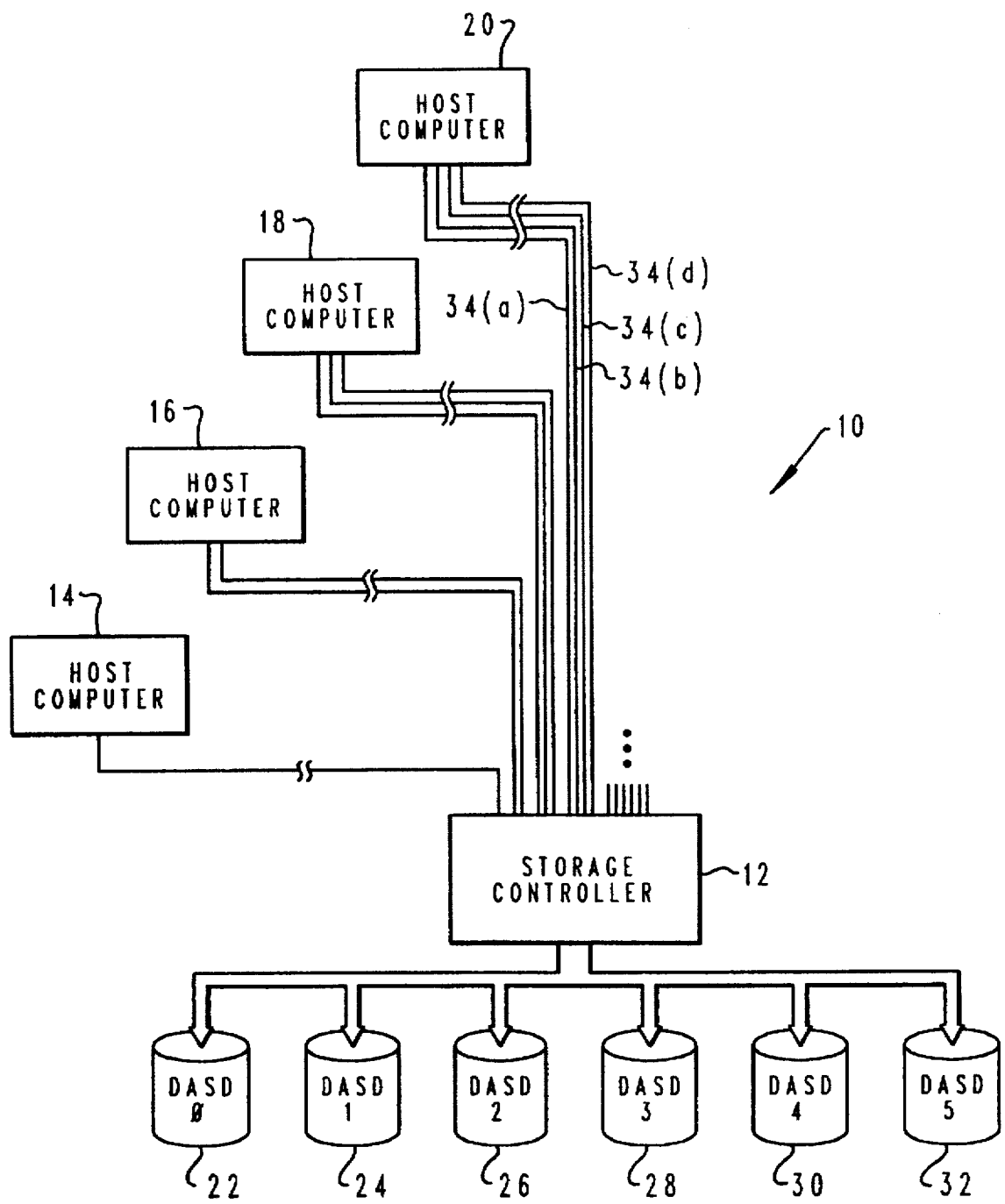
FIG. 1 is a block diagram of a data processing system which may be utilized to implement the method and system of the present invention.

With reference now to the figures and in particular with reference to FIG. 1, there is depicted a high level block diagram of a data processing system 10. Data processing system includes a storage controller 12, a plurality of host computers 14, 16, 18 and 20 and a plurality of direct access storage devices (DASD) 22–32. Direct access storage units 22–32 are generally magnetic storage units, such as disk drives. Storage units 22–32 are also connected to storage controller 12 for selective connection for communication with host computers. Storage controller 12 is preferably an IBM 3990 Model 3 type controller, which is available from IBM Corporation. Host computers 14–20 are typically main frame systems such as the IBM 3090, the ES9000 Model computer, or comparable systems. Host computers 14–20 are connected to storage controller 12 with at least one and up to four channels. For example, host computer 20 is connected to storage controller 12 by channels 34(a), 34(b), 34(c) and 34(d). The channels come in two types, parallel data channels and serial data channels. Certain optical serial channels are used for data transmission up to 20 kilometers. Parallel channels utilize electrical signals and are generally not used at distances of greater than about 125 meters.

Figure 2:
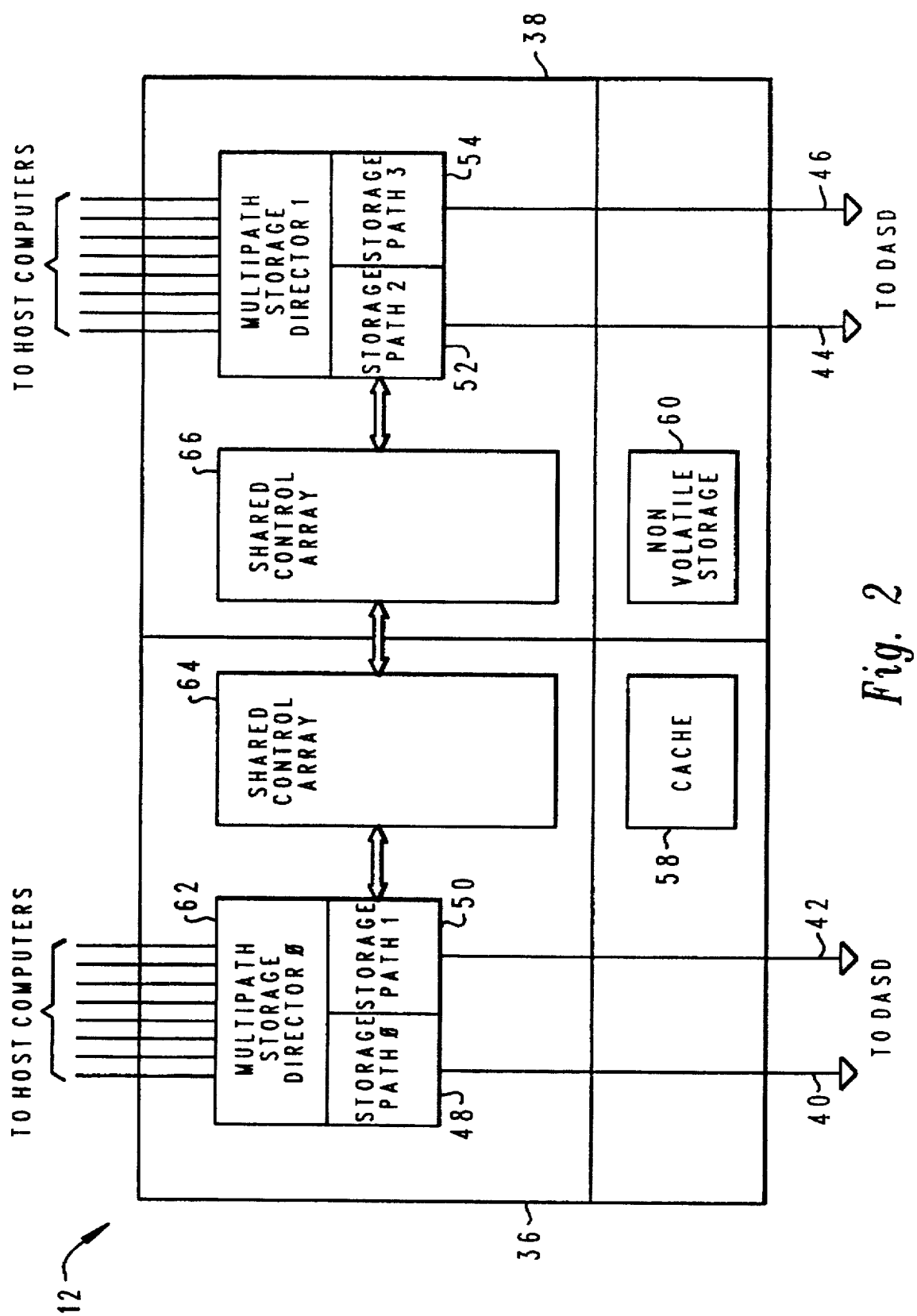
FIG. 2 is a block diagram of a storage controller from the data processing system of FIG. 1.

FIG. 2 depicts storage controller 12 in greater detail. Storage controller 12 has two storage clusters 36 and 38, each of which provides for selective connection between a host computer and a direct access storage device. Although four host computer systems and six direct access storage devices are depicted in FIG. 1, storage controller 12 can handle additional channels and direct access storage devices.

Data from a given host computer system may be stored to any of the direct access storage devices. Data may also be recovered from any of the direct access storage devices for a given host computer. Where a host computer is connected by at least two channels, one each is connected to storage clusters 36 and 38. Similarly, where four channels are provided, two are connected to storage cluster 36 and two to storage cluster 38. Storage controller 12 may receive a request from a host computer over a channel, and respond to the request over any one of the channels connected to the same host computer. The channels associated with one host computer are known as a path group. Storage controller 12 has knowledge of the path groups, having received it from each host computer.

Storage controller 12 has four paths 40, 42, 44 and 46 to the direct access storage devices. Each data path 40–46 is associated with one of storage path processors 48–54, respectively. Each data path goes to all of the direct access storage devices. Only one data path has access to a direct access storage device at a time however. Because storage controller 12 attempts to synchronize disconnects and reconnects between direct access storage devices and host computers based upon rotational position of a disk in the direct access storage device, storage controller 12 may be seen to operate, in essence, as a data transfer traffic manager. An objective of the traffic management scheme is to respond to requests received over the channels to the host computers as quickly as possible. One way to meet this objective is to keep the storage path processors occupied with data moving between host computers and direct access storage devices.

Storage controller 12 is internally divided into sections corresponding to independent power supplies. Two sections are storage clusters 36 and 38, respectively. A third section includes a memory cache 58. A fourth section includes a nonvolatile storage 60. Cache 58 provides storage for frequently accessed data and for the buffering functions of the method of the present invention. Nonvolatile storage 60 is used for temporary storage of data being written to a storage device in order to provide similar response times for cache writes and cache reads. Storage of data in nonvolatile storage under such circumstances allows indication to a host that the storage operation is logically complete, notwithstanding the fact that actual transfer of the data to a direct access storage device has not yet been completed.

Storage clusters 36 and 38 mirror one another in terms of functional features. Accordingly only storage cluster 36 is described here. Storage cluster 36 includes a multipath storage director 62 which operates as a four or eight by two switch between the channels from the host computer systems and storage path processors 48 and 50. Storage cluster 36 also includes a shared control array 64, which duplicates the contents of shared control array 66 in storage cluster 38. Shared control arrays 64 and 66 store path group information as well as control blocks for the direct access storage devices. The shared control arrays may also be used for storage of some of the data structures utilized in controlling cache 58 and in practicing the method of the present invention, as described below. Data structures can also be stored in cache 58.

Figure 3:
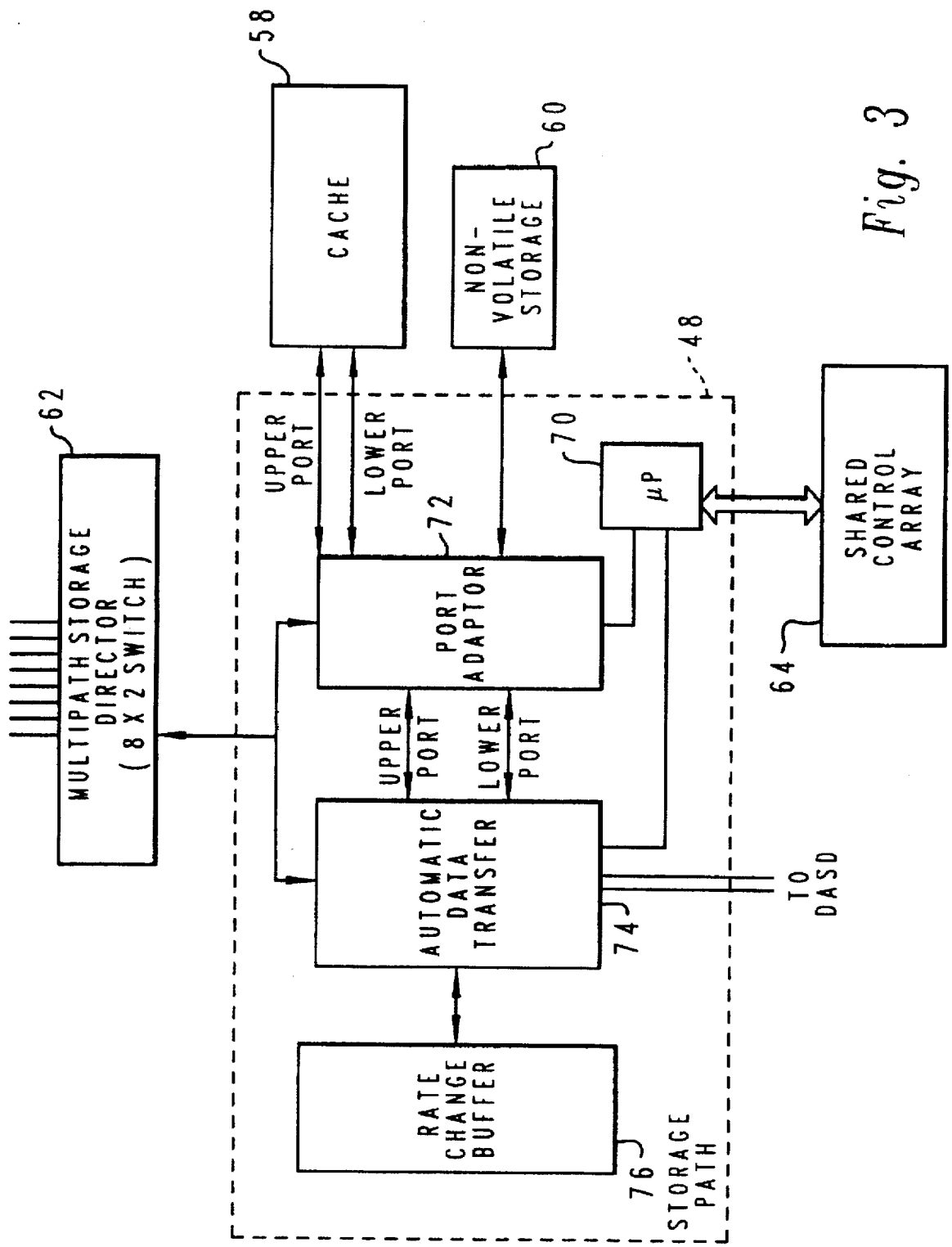
FIG. 3 is a block diagram of a storage path processor.

FIG. 3 illustrates storage path processor 48 in a block diagram schematic. Storage path processor 48 is connected out to multipath storage director 62 by an upper port and to a plurality of direct access storage devices by a lower port. Data transfer between the multipath storage director 62 and one of direct access storage devices during synchronous operations occurs via an automatic data transfer circuit 74 supported by a rate change buffer 76, if required. Rate change buffer 76 compensates for differences between the speed of data transference by disk drive type direct access storage devices and the operating speed of the channels to host computers. The channels typically handle data at a faster rate than the direct access storage devices.

A port adaptor 72 controls transfer of data between cache 58, nonvolatile storage 60 and the lower port. Port adapter 72 also controls transfer of data between cache 58 and the upper port. As discussed above, the presence of cache 58 and nonvolatile storage 60 provide for logical completion of certain data transfers without waiting for physical synchronization of disk and channel connection. All operations of storage path 48 are under control of a microcomputer 70. Before data transfer can begin, the DASD control must be oriented. It does that by detecting either the index point or the start-of-count area other than record zero. Once the count area, or index, has been detected, the device control can work its way down the track to perform the operations commanded by the channel program. After validating the locate record parameters, the control unit directs the device to seek to a first-specified track, positions the device to the designated sector, and begins a search operation to further position itself to a particular record area on the track.

The preferred embodiment operates with records constructed using Extended Count Key Architecture (ECKD). ECKD is an extension of Count Key Data architecture (CKD). Records written on the track are provided with a count field (i.e. an identification tag) and a data field. The record may also include a key field. Count-key-data type direct access storage devices are a class of disk drive type data storage devices, commonly employed with midrange and main frame computers. Historically, data transfer between count-key-data type disk drive units and host computer systems has been a synchronous operation. The connection of elements providing a communication channel between disk drive and host for the data transfer operations are timed to the rotation of the disk.

A language of channel command words is known in the art for the construction of channel command word programs used with ECKD formatted data. The ECKD language is used by host computers in communicating with a storage controller to tell the storage controller what data a host computer process requires and where to find the data. ECKD provides a Defined Extent (DX), Global Attributes Extended Byte for use with write and read commands of a channel program. Within the DX global attributes extended byte set is a regular data format indicator, which must be set by a host computer to invoke execution of the method of this patent.

A channel program in which the regular data format indicator is set and which is intended to utilize the process of this preferred embodiment must meet certain qualifications. The channel program makes exclusive use of ECKD commands. The channel program does not set a CKD conversion mode indicator in the Define Extent (DX) on. These two actions assure that no CKD commands enter the channel program.

Record 0 must be in regular format (i.e. an 8 byte data field with no key field). The data set records are of a fixed size in extent. No record keys may be used in the channel program. All tracks, except the last track in the extent of the channel program are filled with records. The last track may be terminated with an end of file record. Finally, the data set records have identification tags of the form CCHHR, where: CC indicates a cylinder number and where the cylinder numbers for the data set records are monotonically increasing in consecutive order; HH is a physical head (or track) number; and R is the record number, which begin with 1 and increase monotonically in consecutive order. If appropriate, the regular data format indicator is set for channel programs directed both to read and write operations. Following these guidelines assures that complete information is present for the storage controller to manipulate the data set records in updating and writing records in the direct access storage devices through cache 58.

Records received for storage by storage controller 12 as part of a track image which are not already in cache 58 are termed write miss records. To buffer a write miss record in cache 58, a cache directory entry must be created (or already exist) for the track of the record. A directory entry is a control block which defines the direct access storage device and physical address for the record and an address for the track in cache 58. The number of the record will indicate its position in the track. The directory entry is marked to indicate that it is for write miss records. A track does not have concurrent entries for miss records and for a track image (i.e. the image of a track from one of the direct access storage devices).

Write miss record entries for a track are listed in a cache directory entry for the track. The record entries contain data received in the Define Extent and in a Locate Record/Locate Record Extended fields, and pointers and offsets of various types. The track or related write miss record entry must contain a counter of read misses, which is created and initialized to zero when a buffer is set up in cache for the track.

In addition to having the regular data format indicator in the DX global attributes extension byte, there are other constraints on the operation of the process of this patent. The process does not execute when the Define Extent requires bypassing the cache, when a fast write process inhibit indicator is set or when the XRF logging mode is set. The XRF logging mode requires early destaging of fast write process data. It operates essentially as a priority override favoring data which can be stored using the fast write process. The data buffering process of this patent executes when the inhibit cache load parameter in the Define Extent is on and during normal operation of the storage controller.

Figure 4:
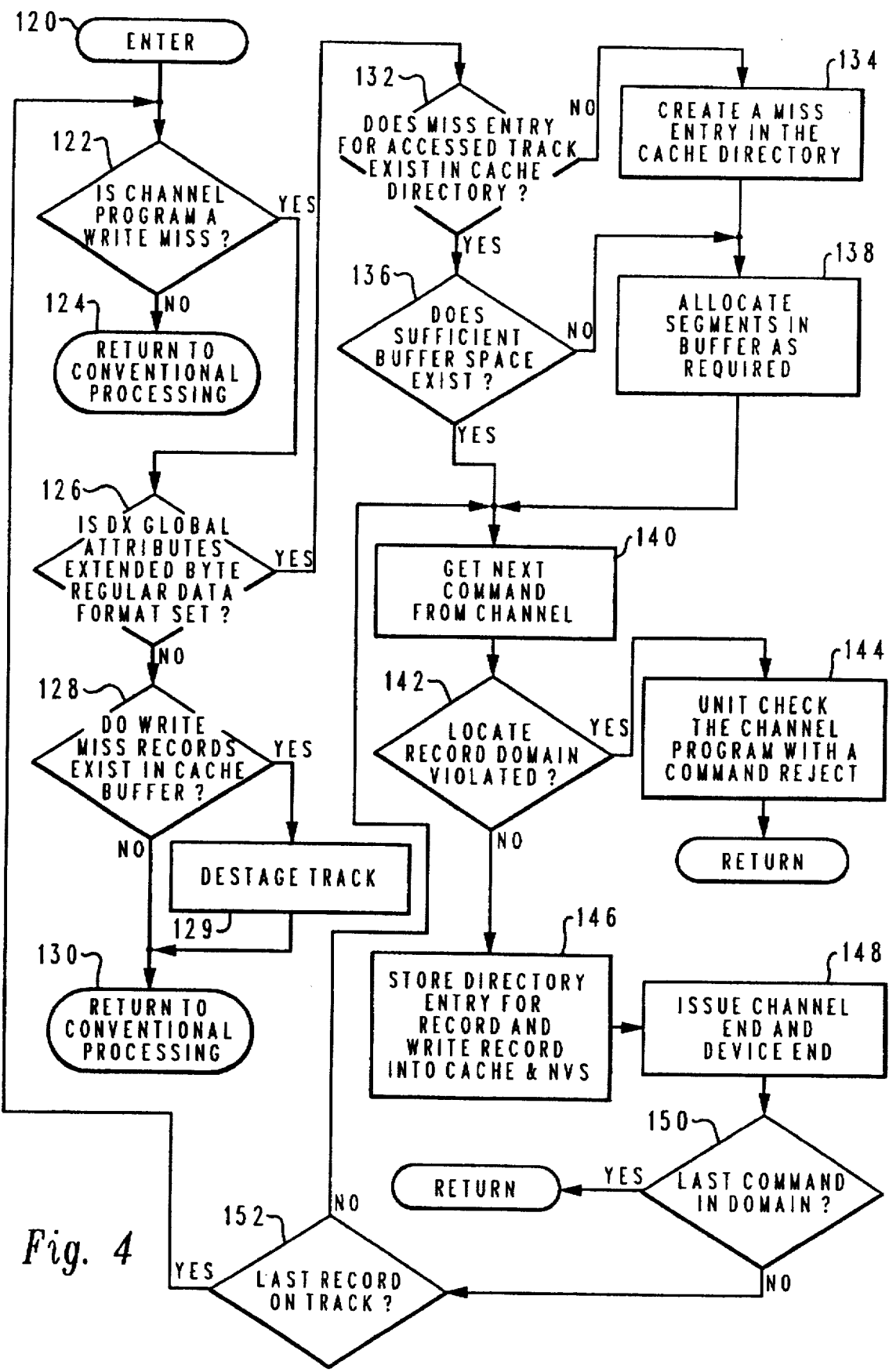
FIG. 4 is a logical flow chart of a process executed by a storage controller in response to occurrence of a cache miss during a write operation.

FIG. 4 is a logical flow chart illustrating storage of a write miss record in response to a channel program. With execution of steps 120 and 122 it is determined if a channel program is a write miss. The NO branch exits the routine by way of step 124 and indicates that a write hit occurred (i.e. the records are part of a track image in cache). Under such circumstances the buffering process is not needed.

Step 126 is executed to determine whether the data from the host computer is indicated to be in an appropriate format for buffering in cache 58. This is done by checking for the regular data format indicator in the Define Extent. If the indicator is not set, step 128 is executed. In step 128, if write records exist in a buffer space for the accessed track in cache, the records are destaged to a direct access storage device (step 129). The process is exited along the NO branch from step 128 or after step 129 through step 130.

Step 132 is reached after a write miss and detection of the regular data format indicator. Steps 132, 134, 136 and 138 relate to housekeeping tasks for setting up a buffer in cache 58 to store the track containing the write miss records. With execution of step 132 it is determined if a miss entry for an accessed track exists in the cache directory. If not, buffer space must be allocated for a track. Steps 134 and 138 are then executed to create the appropriate data structures (including a miss entry in the cache directory) for record in cache 58 and to allocate segments in cache 58 for its storage. If a miss entry was found in step 132, the number of allocated segments in cache 58 is examined for sufficiency. If not sufficient, step 138 is executed to allocate additional segments to the buffer space.

From step 138, or along the YES branch from decision step 136, the process advances to step 140. Step 140 is executed to retrieve the next command in sequence from the channel command word program. With execution of step 142 it is determined if the command violates the Locate Record Domain. Only the write commands in the domain of the Locate Record/Locate Record Extended are executed. The presence of CKD commands constitutes a violation of ECKD mode. Other violations include the presence of seek and search commands in the channel program and a set CKD conversion mode indicator. A violation results in issuance by the storage controller of a Unit Check and return of a rejection of the command to the host (step 144). The process is then exited.

Step 146 follows determination that the Locate Record Domain was not violated. With execution of step 146 a directory entry for the record is stored and the record is written into cache 58 and NVS 60. Next, step 148 is executed to issue channel end and device end signals to the host computer indicating that storage of the record is logically complete.

Next, step 150 is executed to determine if all commands in the channel program have been executed. If they have, the operation is complete and the process may be exited. If commands remain for execution in the channel program, it is determined by execution of step 152 if the program operates on additional records in the current track image. If there are such records, the process is still in the condition of a write hit and is returned to step 140 to retrieve the next command in the program. If the last record on the track has been processed, the program is moving to a record on another track and it must be determined if a track image exists in cache 58 for the new track. The process is therefore returned to step 122 and processing continues as just described.

Figure 5A:
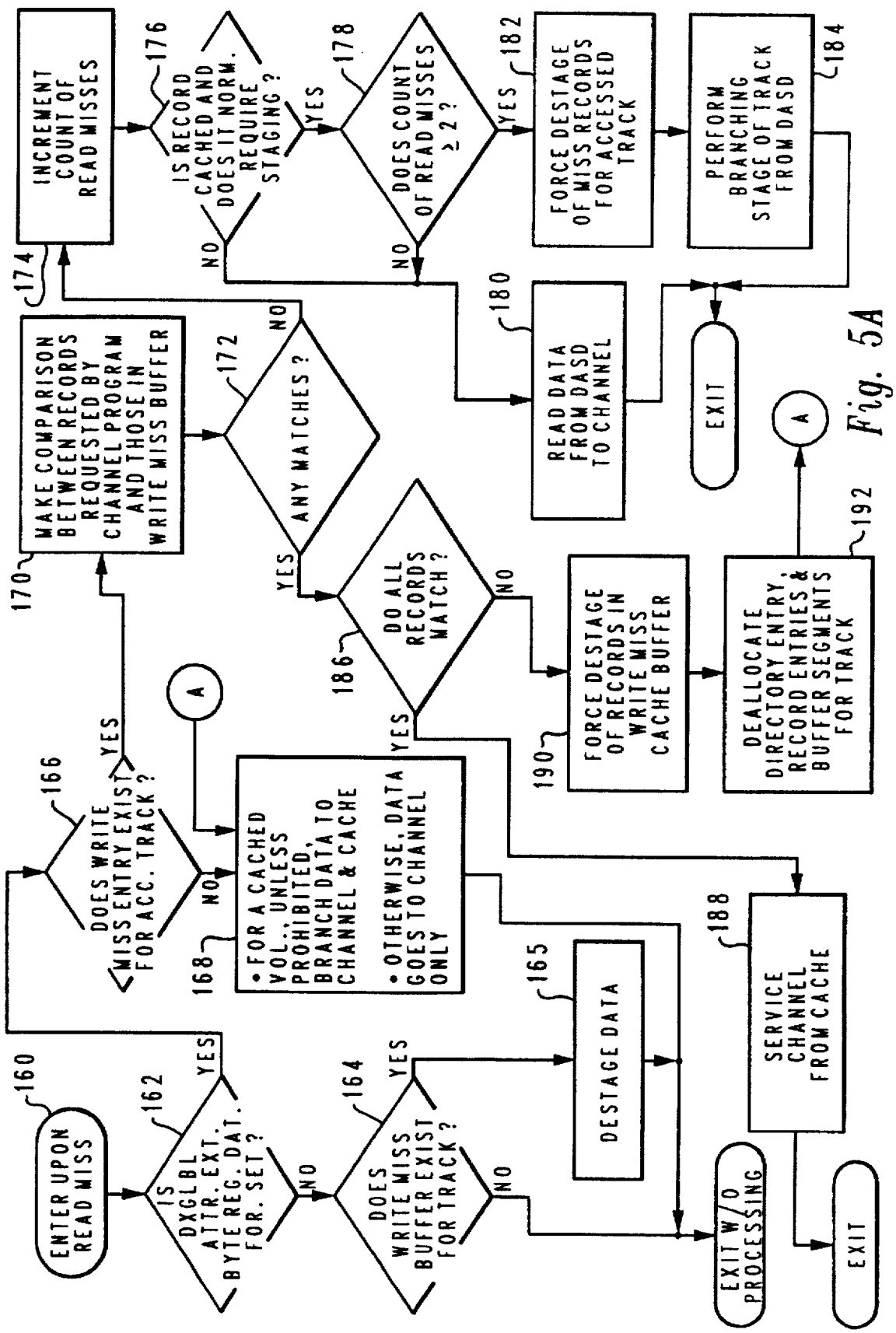
FIG. 5A is a logical flow chart of a process executed by a storage controller to handle the possible occurrence to read operations directed to buffered but not destaged records in a cache.

A read miss occurs in response to a read command. It occurs when a record is not in cache, or when a record is a noncaching record, whether resident in a buffer segment allocated from cache or not. FIG. 5A illustrates a logical flow chart of a process for handling channel programs requesting a read operation where buffering of records has raised the possibility of inconsistency between cache 58 and the record in a direct access storage device even though a read miss is indicated. The process is entered at step 160. At step 162 it is determined if the regular data format indicator is set in the DX global attributes extension byte. If not, the process is not used. The process is exited by step 164, which provides for checking the cache directory for the presence of the accessed track, if the fast write process is active. If present, its write miss records are destaged (step 165) before further execution of the channel program is allowed.

If the regular data format indicator was set, step 166 is executed to determine if a write miss entry exists for the accessed track. If not, no inconsistency pertinent to the present channel program exists. Along the NO branch step 168 is executed. If the record (volume) is a caching record, the data is staged from a direct access storage device onto the channel and into cache 58. If caching is prohibited, or for a noncaching record, the data is staged from a direct access storage device onto the channel only.

Where a write miss entry exists, steps 170 and 172 are executed. In steps 170 and 172, a comparison is undertaken between the records requested by the channel program and the records in the write miss buffer. There will either be matches or there will not be matches. Along the NO (matches) branch from step 172, step 174 is executed to increment the count of read misses. Next, step 176 is executed to determine if the record is a caching record which normally requires staging on a read miss. If the record is not being cached, or caching has been disabled. The accessed records are simply staged from a direct access storage device to update cache and sent to the channel (step 180). For the first case, the count of read misses is tested (step 178). If the count is fewer than two, the accessed records are simply staged from a direct access storage device and sent to the channel (step 180). If the count is two or greater, step 182 is executed to force a destage of the miss records for the accessed track, to deallocate the record buffers and the directory entry for the records. The remained of accessed track are then staged from a direct access storage device and branched to cache and the channel (step 184).

Where matches were detected in the comparison test of steps 170 and 172, step 186 is executed to determine if all of the records matched. If yes, the channel program is satisfied from cache 58 (step 188). If some records matched and some did not, a more complex response is required. Step 190 is executed to force a destage of records for the accessed track from the write miss cache buffer. Next, step 192 is executed to deallocate the directory entry for the destaged track, to deallocate record entries and to deallocate the buffer segments for the track. Processing is returned to step 168 via on page connector A.

Figure 5B:
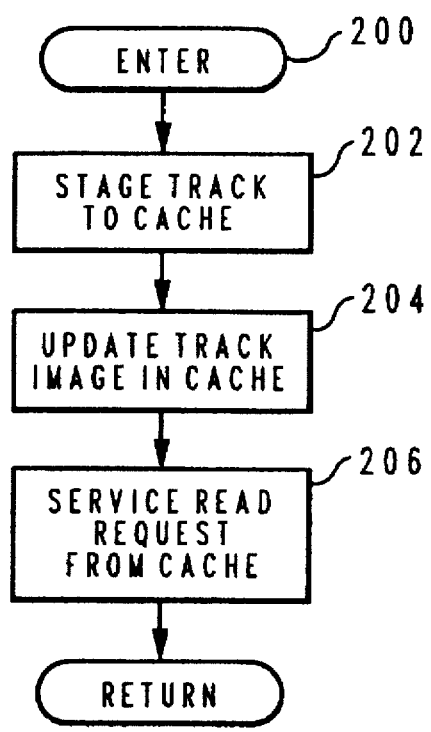
FIG. 5B is a logical flow chart of a variation of the process of FIG. 5A.

At the cost of increased complexity, an alternative to steps 190 and 192 is to immediately stage the accessed track and update its image in cache 58. FIG. 5B illustrates a flow chart for subprocess suitable for substitution for the indicated steps. The subprocess is entered at step 200. At step 202 the accessed track is staged to cache 58. Next at step 204 the track image is updated in cache. This can involve movement of a number records within cache 58. Finally the read request is serviced from cache 58 (step 206). The updated track can be destaged as a background process as convenient.

Figure 6:
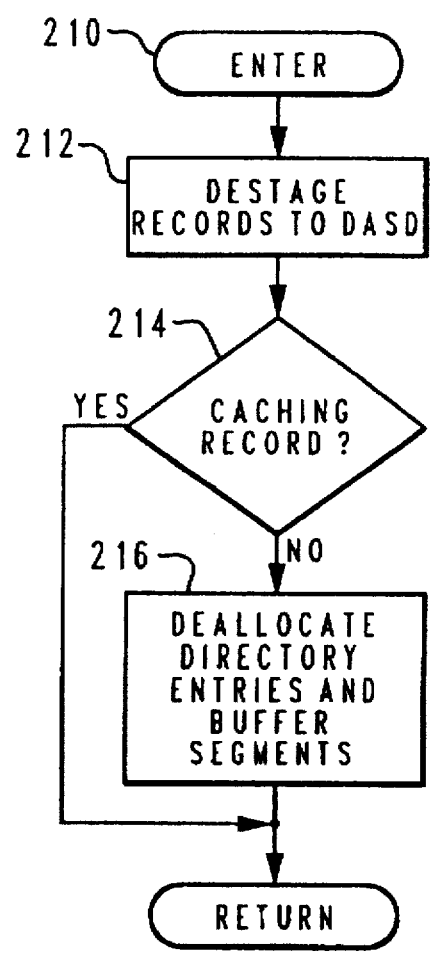
FIG. 6 is a logical flow chart of a process for implementing a destaging operation for records from cache to permanent storage.

FIG. 6 illustrates a flow chart for a destaging process. The process is entered at step 210. At step 212 records are destaged to a direct access storage device. Next, at step 214 it is determined if the records were caching records. If yes, destaging is complete. The records remain in cache until removed by normal aging in the MRU and LRU doubly linked lists. If the records are not caching records, the control structures used for control of the records while in cache 58 are deallocated. The temporary presence of noncaching records in cache 58 for buffering is not reflected in the MRU and LRU lists. The destage process destages all records in the same internal channel program. Multiple tracks can also be destaged.

While the invention has been particularly shown and described with reference to a preferred embodiment, it will be understood by those skilled in the art that various changes in form and detail may be made therein without departing from the spirit and scope of the invention.

What is claimed is:

1. In a data storage system including a plurality of direct access storage devices and a storage controller having a buffer memory, the storage controller being connected to each of the plurality of direct access storage devices, a method of storing data received from a host computer over a channel comprising the steps of:

responsive to receipt of data for a record over a channel, said record being a caching record or a non-caching record, determining if the record is part of a track image in the buffer memory;

responsive to determination that the record is not part of a track image, determining if a format for the record is of a particular type;

responsive to determination that the format for the record is of a particular type, checking for allocation of space for the record in the buffer memory;

responsive to space for the record not being allocated, allocating space for the record, as either caching record or non-caching record;

storing the record in the buffer memory; and destaging the record from the buffer memory to a direct access storage device, said step of destaging the record further comprising:

determining if the record is a caching record or a non-caching record; and if the record is a non-caching record, deallocating the space for the record in the buffer memory.

2. A method as set forth in claim 1, further comprising the steps of, after said step of destaging has begun and before said step of destaging has finished:

receiving a request to read records over a channel;

determining if the records are non-caching records;

determining if the records to be read are in the buffer memory;

if the records to be read are non-caching records and all are in the buffer memory, servicing the request from the buffer memory;

if some but not all of the records to be read are in the buffer memory, destaging of the records to selected direct access storage devices and servicing the request from the direct access storage devices; and if none of the records are in the buffer memory, servicing the request from the direct access storage devices.

3. A method as set forth in claim 1, further comprising the steps of, after said step of destaging has begun and before said step of destaging has finished:

receiving a request to read records over a channel;

determining if the records are non-caching records;

determining if the records to be read are in the buffer memory;

if the records are non-caching and if some but not all of the records are in the buffer memory, staging the records and an associated data component to the buffer memory from said plurality of direct access storage devices as a data component image;

updating the data component image by substituting the records previously in the buffer memory for records in the data component image; and servicing the request from the buffer memory.

4. A data processing comprising:

a plurality of host computers;

a storage system including a plurality of direct access storage devices and a storage controller having a buffer memory, the storage controller being connected to each of the plurality of direct access storage devices by a storage path and to each of the host computers by at least a first channel;

means responsive to receipt of data for a record over a channel for determining if the record is part of a track image in the buffer memory;

means responsive to determination that the record is not part of a track image for determining if a format for the record is of a particular format;

means responsive to determination that the format for the record is of a particular format for checking for allocation of space for the record in the buffer memory;

means responsive to allocation of insufficient space for the record for allocating additional space in the buffer memory for caching or non-caching record; and means for destaging the record from the buffer memory to a direct access storage device;

means responsive to destaging the record from the buffer memory to a direct access storage device for determining if the record is a caching record or a non-caching record;

means, responsive to determination that the record is a non-caching record, for deallocating the space for the record in the buffer memory.

5. A data processing system as set forth in claim 4, wherein the host computers include means for indicating a format for the records to the storage controller.

6. A data processing system as set forth in claim 4 further comprising:

means for receiving a request to read records over a channel, after said destaging has begun and before said destaging has finished;

means for determining if the records are non-caching records;

means for determining if the records to be read are present in the buffer memory;

means responsive to the presence of the records to be read in the buffer memory and to the records being non-caching records for servicing the request from the buffer memory;

means responsive to the records being non-caching records and to the presence of some but not all of the records to be read in the buffer memory for forcing destaging of the records in the buffer memory to a direct access storage device and for servicing the request from the direct access storage device; and means responsive to the presence of none of the records in the buffer memory for servicing the request from the direct access storage device.

7. A data processing system as set forth in claim 4, further comprising:

means for receiving a request to read records over a channel, after said destaging has begun and before said destaging has finished;

means for determining if the records are non-caching records;

means for determining if the records to be read are in the buffer memory;

means responsive to the records being non-caching and to the presence of some but not all of the records in the buffer memory for staging the records and associated data components to the buffer memory from said plurality of direct access storage devices as a data component images;

means for updating the data component image by substituting the records previously in the buffer memory for records in the data component image; and means for servicing the request from the buffer memory.

* * * * *